Aug. 4, 1942.   E. J. THURBER   2,292,253
TRANSMISSION CONTROL
Filed July 23, 1938   5 Sheets-Sheet 5

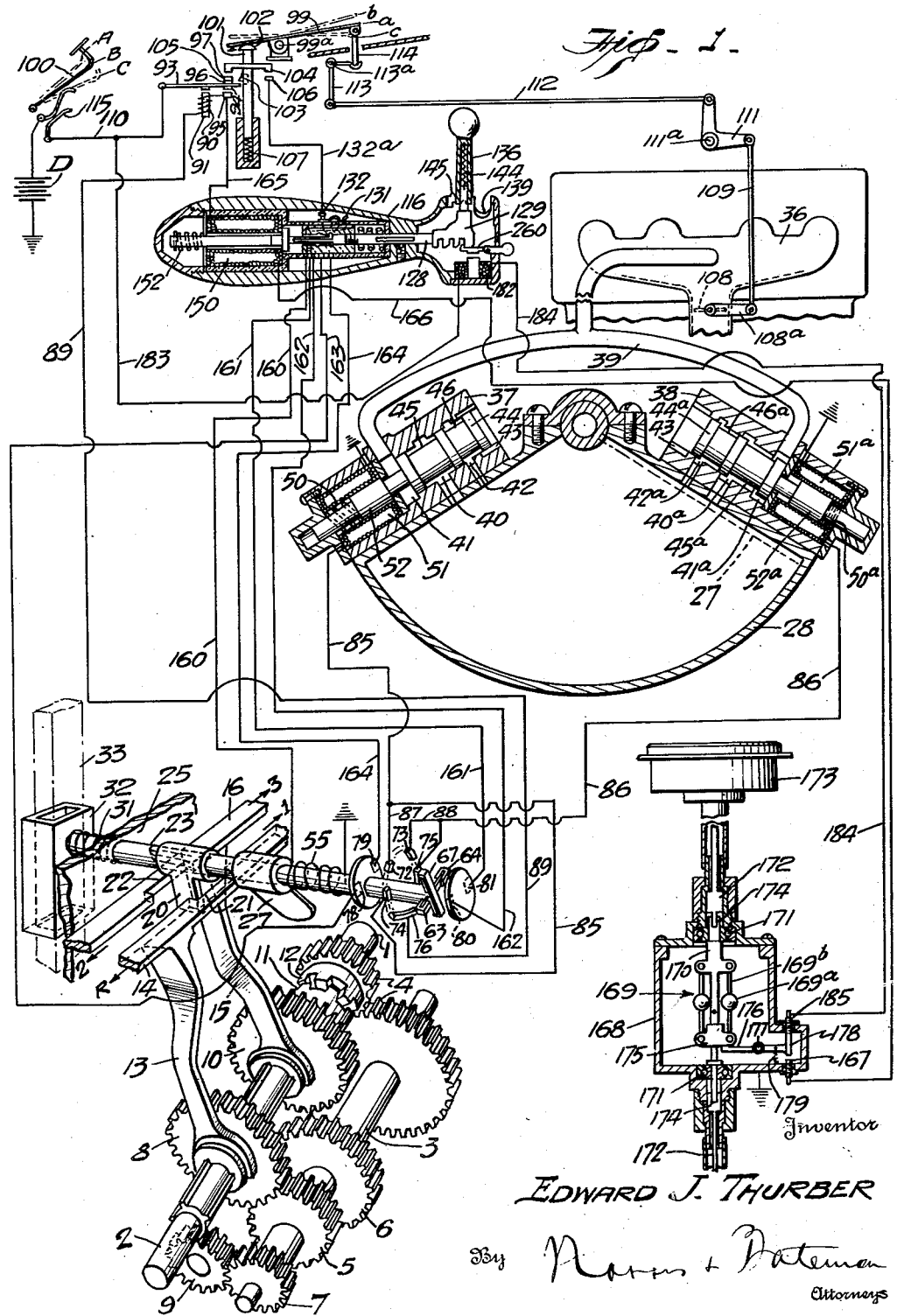

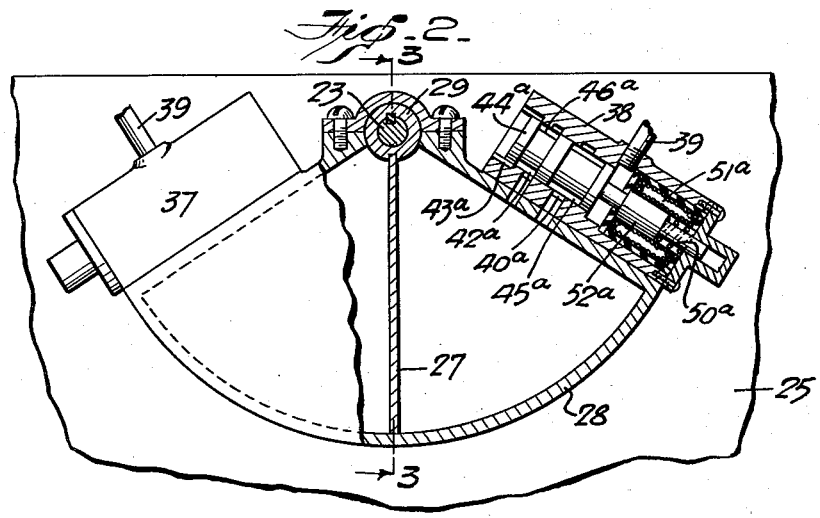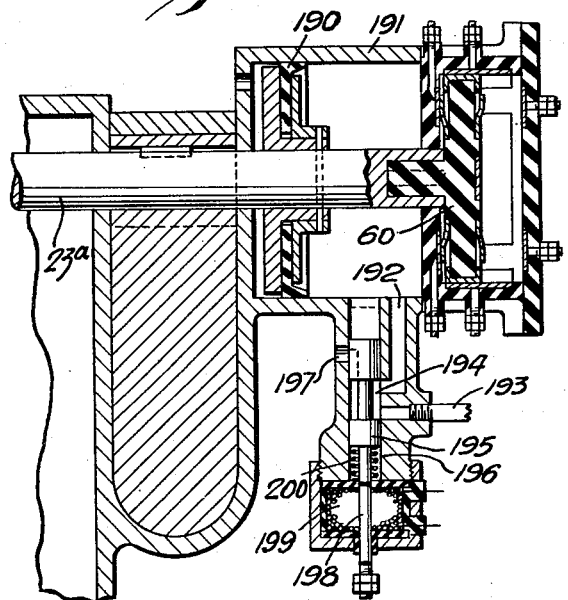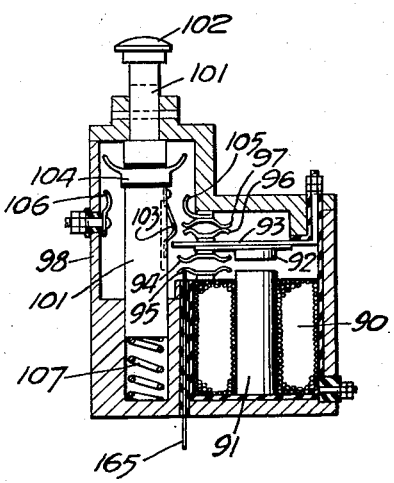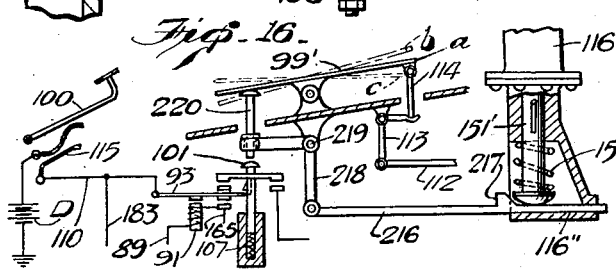

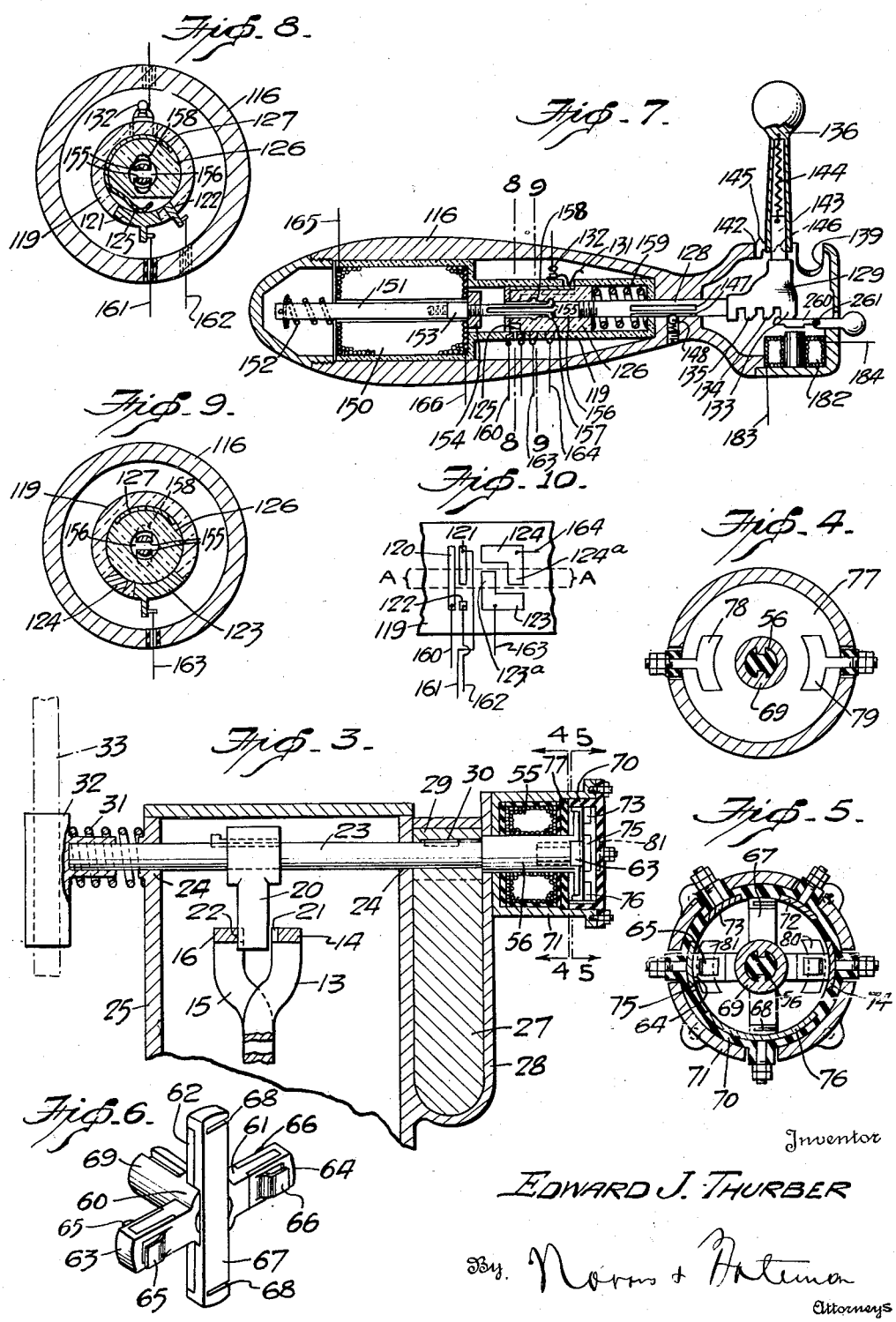

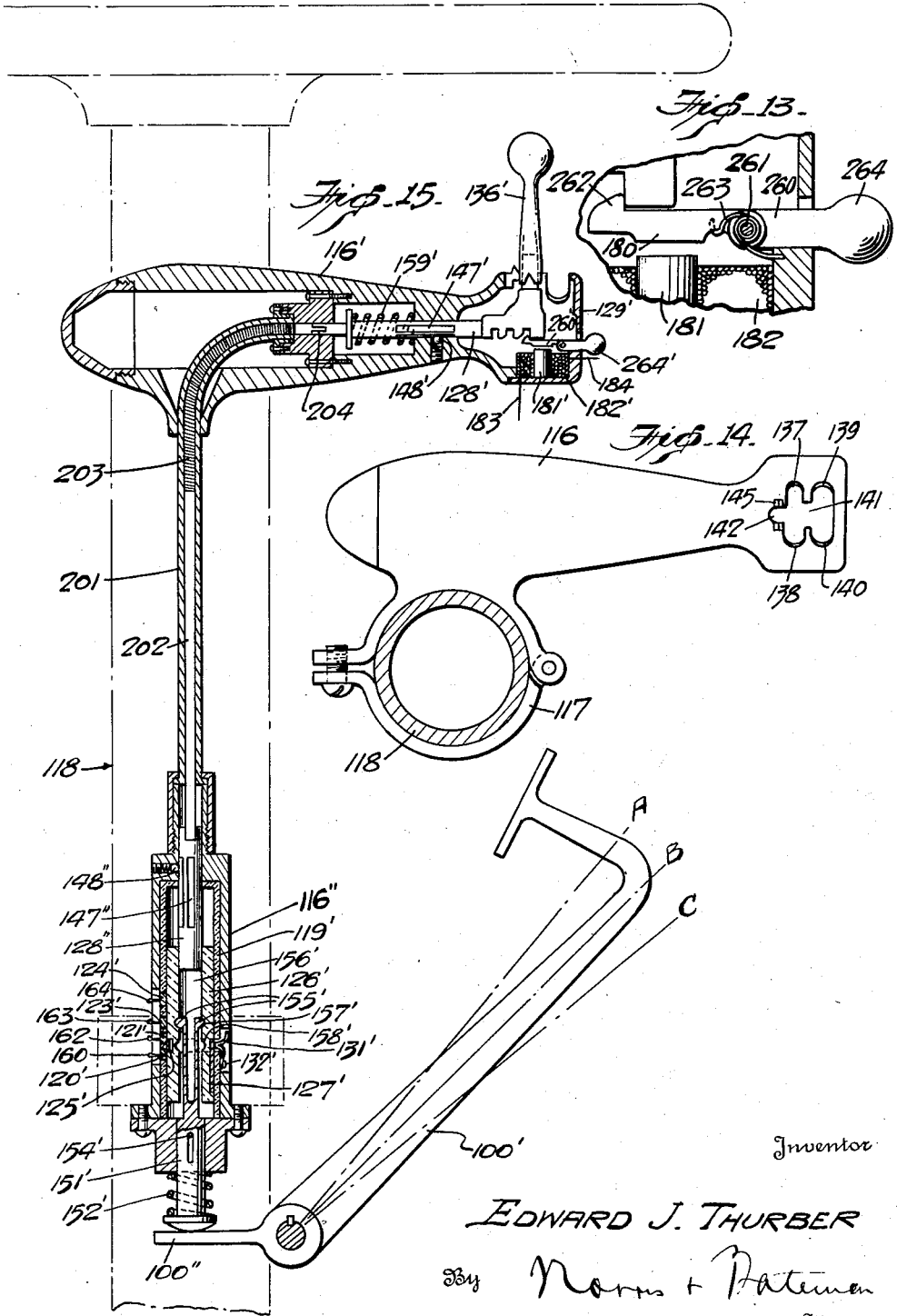

Inventor.
EDWARD J. THURBER
By
Attorneys.

Patented Aug. 4, 1942

2,292,253

UNITED STATES PATENT OFFICE 2,292,253

TRANSMISSION CONTROL

Edward J. Thurber, New Orleans, La.

Application July 23, 1938, Serial No. 220,965

36 Claims. (Cl. 192—.01)

The present invention relates to improvements in speed changing means for variable speed transmissions or other mechanisms, and more especially transmissions used for automobiles, and the invention relates more particularly to means for controlling automobile transmissions of the conventional selective speed type to effect different desired speed changes, the controlling means according to the present invention being similar to that disclosed in my prior application Serial No. 65,714, filed February 25, 1936, now Patent No. 2,156,209 granted April 25, 1939, but including further features and improvements.

One of the primary objects of the present invention is to provide novel and improved controlling means embodying selecting means the operation of which is controlled by successive actuations of a power controlling element of the automobile such as the main clutch pedal or the accelerator pedal, or both of such pedals operating conjointly to automatically select the speed changes progressively, as from first speed through an intermediate speed or speeds to high speeds.

Another object is to provide such controlling means which enables any desired speed change to be selected manually or at the will of the driver, independently of such automatic control.

Another object is to provide such controlling means wherein the times when the speed changes selected either automatically or manually are actually made is controlled by a fuel controlling element of the automobile engine, such as the accelerator pedal.

Another object is to provide such controlling means embodying selecting means which is restored to first speed from for example third or high speed when the speed of the automobile is reduced below a predetermined speed or when the automobile is stopped, automatically, upon actuation of the main clutch pedal, or which can be restored to first speed from any other speed manually or at the will of the driver.

Another object is to provide means for preventing unintentional actuation of the selecting means by careless operation of the accelerator pedal while the automobile is not in motion.

Another object is to provide a device responsive to movement of the automobile for controlling the operation of the selecting means for the speed changing mechanism, which device is associated with and connected to the drive shaft for the speedometer of the automobile, thereby facilitating and minimizing the cost of installation.

Another object is to provide selecting means for the speed changing mechanism which is controlled automatically or manually as described, the elements of which selecting means are constructed as a unit which may be mounted on the steering column of an automobile.

Another object of the invention is to provide novel and improved means for actuating the speed changing elements which embodies means located at a side of the transmission casing to removably receive a handle or lever for operating the transmission to effect the different speed changes manually in the usual manner when desired, thereby reducing the height of the transmission so that it may be accommodated beneath the floor of the automobile without the necessity of raising the portion of the floor above the transmission, thereby avoiding an obstruction in the floor above the transmission, as heretofore.

To these and other ends, the invention consists in certain improvements and combinations and arrangements of parts all as will be hereinafter more fully described, the features of novelty being pointed out more particularly in the claims at the end of this specification.

In the accompanying drawings:

Fig. 1 is a diagrammatic view of speed changing means for an automobile transmission, embodying the present invention;

Fig. 2 is a detail view, partly in section, of a portion of an automobile transmission, showing fluid pressure operating means for operating the actuating member to effect the different gear changes;

Fig. 3 is a vertical section taken on the line 3—3 in Fig. 2;

Fig. 4 is a vertical section, on an enlarged scale, taken on the line 4—4 in Fig. 3 and looking in the direction of the arrows;

Fig. 5 is a vertical section, on an enlarged scale, taken on the line 5—5 in Fig. 3 and looking in the direction of the arrows;

Fig. 6 is a detail perspective view of the controlling contact member which is governed to move in accordance with the movements of the actuating member;

Fig. 7 is a detail longitudinal section of the switch and its operating means by which the different speed changes are selected;

Fig. 8 is a detail section taken on the line 8—8 in Fig. 7;

Fig. 9 is a detail section taken on the line 9—9 in Fig. 7;

Fig. 10 is a detail view, on an enlarged scale, of the contacts of the selecting switch;

Fig. 11 is a detail vertical section of the switch which controls the restoring of the gear changing elements to neutral condition and thereafter effects the different gear changes and performs certain other functions as will hereinafter appear;

Fig. 12 is a detail section of a modification of the means for controlling or operating the actuating member which effects the speed changes;

Fig. 13 is a detail view, on an enlarged scale, of the latch forming part of the selecting means;

Fig. 14 is a top plan view of the selecting means, showing means for mounting it on the steering column of an automobile;

Fig. 15 is a sectional view of a modified form of selecting means;

Fig. 16 is a view of a portion of the selecting means shown in Fig. 15 but showing the same operated by the accelerator pedal of an automobile;

Similar parts are designated by the same reference characters in the different figures.

Figure 17:
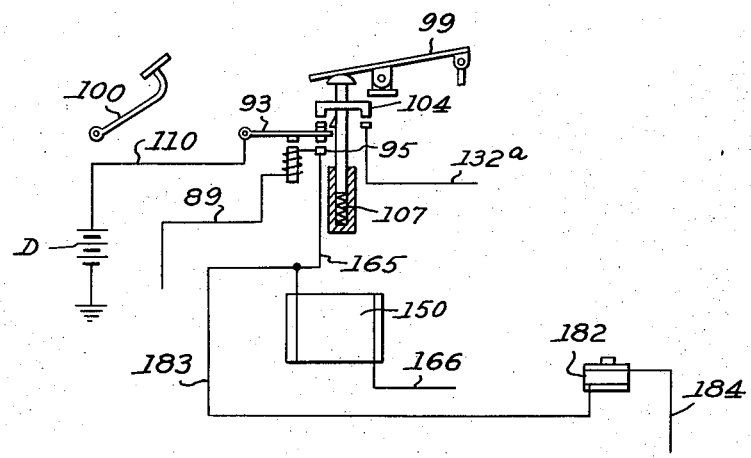
Fig. 17 is a fragmentary diagrammatic view, showing an arrangement in which the speed changes are controlled by the accelerator pedal only.

Speed changing means embodying the present invention are applicable generally to changeable speed mechanisms of various kinds to facilitate the control of operation thereof to provide different speeds, although the invention is applicable more particularly to automobile transmissions of conventional form employing a pair of reciprocatory shifting bars connected respectively to the sliding gears or speed changing elements, each of these bars being usually slidable from a normal or neutral position in either direction to effect one or another speed change.

The preferred embodiments of the invention are shown in the accompanying drawings and will be hereinafter described in detail, but it is to be understood that the invention is not restricted to the precise constructions shown since equivalent constructions are contemplated and such will be included within the scope of the claims.

The invention is shown in the present instance as applied to an automobile transmission of conventional form comprising the usual main or clutch shaft I driven as usual through the usual main clutch from the automobile engine, 2 represents the usual main shaft of the transmission which is connected at its rear end as usual to the rear or driving wheels of the automobile, 3 represents the usual countershaft of the transmission, it being driven from the clutch shaft I by gears 4 as usual and having first, second and reverse gears 5, 6 and 7 fixed thereon, the main transmission shaft 2 having a sliding gear 8 splined thereon and shiftable from its normal or neutral position into mesh either with the first speed gear 5 or with the usual idler reverse gear 9 meshing with the reverse gear 7 on the countershaft, and the main shaft 2 also has a sliding gear 10 splined thereon and shiftable in one or the other direction from its normal neutral position to engage it either with the second speed gear 6 or to engage a clutch member 11 fixed thereon with a clutch member 12 fixed to the clutch shaft I to set the transmission mechanism for third or high speed drive. The sliding gear 8 which sets the transmission for first speed or reverse is engaged by a sliding fork 13 fixed to a reciprocatory shift bar 14 which is mounted to reciprocate in the transmission casing as usual, and the second and third speed gear 10 is engaged by a shifting fork 15 which is fixed to a shifting bar 16 which is mounted to reciprocate in the transmission casing. The transmission shown is of a well known conventional form and is given by way of an example of a changeable speed mechanism to which the present invention is applicable.

The reciprocatory gear shifting bars are actuated by an actuating member 20 which, in the present instance, is shiftable laterally to operatively engage it either in a notch 21 in the inner side of the shifting bar 14 or a notch 22 in the inner side of the shifting bar 16, and the actuating member is rockable or reciprocatory at its lower end to shift the shifting bar with which it is engaged, in one direction or the other, to effect the different speed changes. As shown in the present instance, the actuating member is keyed or otherwise fixed on a shaft 23 which is rotatable and also shiftable axially in bearings 24 provided in the upper portion of the transmission casing 25, the shaft 23 serving to operate the actuating member.

Preferably, as shown in the present instance, the actuating member is rocked on its pivotal axis or reciprocated to effect the different gear changes by fluid pressure means, that shown in the present instance being similar to the means shown in my prior application hereinbefore referred to, comprising a piston 27 in the form of a vane which is fitted to swing in an arcuate path within an arcuate fluid pressure chamber 28 formed on or attached to a side of the transmission casing, the vane having a hub 29 to which it is fixed, and the hub 29 being splined on the shaft 23, as by a key 30 whereby the swing of the vane 27 in either direction will cause the shaft 23 to rotate in the corresponding direction, and the shaft 23 may be shifted axially within the hub of the vane to connect the actuating member 20 with one or the other of the shifting bars while maintaining an operating connection between the actuating member and its operating vane 27.

Preferably, the actuating member 20 is normally held yieldingly in operating relation with the shifting bar 16 which sets the transmission for second and third speeds, by a coiled compression spring 31 which encircles the shaft 23 and bears at one end against a side of the transmission casing and at its other end against the side of a socket 32 which is fixed on an end of the shaft 23 which extends through a side of the transmission casing and is exposed exteriorly thereof, the socket 32 having an opening therein which extends vertically or substantially so and is adapted to removably receive the lower end of a handle or lever 33 which corresponds with the usual hand shifting lever, thus enabling the speed changes to be effected manually or by the usual hand shifting lever when such is desired.

The transmission shown in the present instance is of lower height than transmissions heretofore used generally in automobiles in which a hand shifting lever is inserted into the top of the transmission casing, it being noted that the top of the transmission casing is closed by a cover which is located immediately above the operating shaft 23, and as the socket 32 for the hand shifting lever is located at a side of the transmission so that its presence does not increase the height of the transmission, the latter may be located below the floor of an automobile without requiring the raising of the portion of the floor above it and which has been objectionable because of the obstruction formed in the floor but which is avoided by the transmission constructed as herein shown.

The vane 27 is caused to swing from the neutral position shown in Fig. 2, in either direction toward one or the other end of the casing 28 by creating a difference in fluid pressure in the casing at opposite sides of the vane. Preferably the vacuum pressure available in the intake manifold 36 of the automobile engine is utilized conveniently to effect the operations of the vane, communication of one or the other side of the vane with the intake manifold being controlled by a pair of valves 37 and 38, these valves being connected to the intake manifold by a pipe 39. These valves may be of any suitable construction, those shown each comprising ports 40 and 40ª which communicate with the respective ends of the casing 28, ports 41 and 41ª which communicate with the pipe 39, ports 42 and 42ª which communicate with the respective ends of the vane casing, and ports 43 and 43ª which communicate with the atmosphere. These valves also each embody a valve piston or plunger 44 or 44ª fitted to reciprocate axially, each piston or plunger having a groove 45 or 45ª and a groove 46 or 46ª. These ports and grooves of these valves and their pistons are so located that when the valve piston is in one position the groove 45 or 45ª will connect the ports 40 and 41 or 40ª and 41ª, thus connecting the respective end of the vane casing 28 with the intake manifold to establish a vacuum pressure in the corresponding end of the vane casing and at the same time the port 42 or 42ª will be closed to the atmospheric vent 43 or 43ª, and when the valve piston occupies another position, it will intercept communication between the ports 40 and 41 or 40ª and 41ª and will establish communication between the port 42 or 42ª and the atmospheric vent 43 or 43ª. For example, as shown in Fig. 1, the valve piston 44 is in a position to intercept communication between the vacuum ports 40 and 41 while the port 42 is in communication with the atmospheric vent port 43, and the valve piston 44ª is in a position to establish communication between the vacuum ports 40ª and 41ª and to intercept communication between the port 42ª and the atmospheric vent port 43ª. With the valves set as shown in Fig. 1, a vacuum pressure will be established at the right hand end of the vane casing 28 and atmospheric pressure entering the left hand end of the vane casing will act to swing the vane 27 toward the right hand end of the casing 28 in this figure. Reversal of the positions of the valve pistons in the valves 37 and 38 will cause the vane to swing to or toward the left hand end of the vane casing.

The pistons 44 and 44ª of these valves are normally held in positions to interrupt communication between the respective ends of the vane casing and the intake manifold and to establish communication between both ends of the vane casing and the atmosphere, by compression springs 50 and 50ª, and solenoids 51 and 51ª are preferably provided for shifting the valve pistons to establish communication between one or the other end of the vane casing and the intake manifold, these solenoids cooperating with solenoid cores 52 and 52ª respectively which are carried by stems attached to the respective valve pistons, energizing of one or the other solenoid serving to shift the respective valve piston into the position shown for the valve 38 in Fig. 1.

It will be understood that the swing of the vane 27 in one or the other direction under control of the valves 37 and 38 will swing or rock the actuating member 20 to effect corresponding reciprocation of the shifting bar 14 or 16 to which it is operatively connected. While the actuating member, as hereinbefore stated, is preferably connected normally to the second and third speed shifting bar 16 under the action of the spring 31, means is provided for disconnecting the actuating member from that shifting bar and connecting it to the shifting bar 14 so that the latter may be operated to set the transmission for first speed or reverse, and the means provided in the present instance for controlling the connection of the actuating member to one or the other shifting bar is electromagnetically controlled. In the construction shown in Figs. 1 and 3 a solenoid 55 is employed for this purpose, it cooperating with a solenoid core 56 which is carried by the shaft 23 and is coaxial therewith. By this arrangement, when the solenoid 55 is energized, the shaft 23 will be pulled axially from its normal position shown in Fig. 3 toward the right in that figure, thereby withdrawing the actuating member 20 from engagement in the notch 22 in the shifting bar 16 and engaging the actuating member in the notch 21 in the shifting bar 14, assuming that the shifting bars 14 and 16 at this time are both in neutral position so that the notches 21 and 22 in their inner or adjacent sides are directly opposite to one another. Deenergization of the solenoid 55 will enable the spring 31 to return the actuating member 20 to its normal connected relation with the shifting bar 16.

In the embodiment of the invention shown in the present instance, a governing switch which is movable in accordance with the movements of the actuating member is employed to control the restoration of each speed or gear changing element in the transmission to neutral position and to control the energization of the solenoids of the valves 37 and 38 to cause the actuating member to effect one or another speed change. This switch comprises a switch member 60 the body of which is composed of "Bakelite" or other suitable insulating material having a pair of cross arms 61 and 62 thereon preferably in right angular relation. The ends of the cross arm 61 are provided with contacts 63 and 64 which are exposed at the ends and the two opposite sides of such cross arm, the sides of these contacts being preferably provided with resilient or spring brushes 65 and 66, and the cross arm 62 has a contact strip 67 extending from end to end thereof, this contact strip being exposed at the ends of this cross arm and being preferably slotted as shown at 68 to render the ends of this contact member resilient or yieldable. The contact member 60 is formed with a central hub or stem 69 which is keyed or otherwise fixed in the outer end of the solenoid core 56 so that this contact member will rotate and also shift axially with the shaft 23. This contact member is fitted to rotate and also shift axially within a switch casing 70 which is composed of "Bakelite" or other insulating material and which may be removably secured to the outer end of a casing 71 which contains the solenoid 56, the casing 71 being attached to the outer side of the vane casing 28. The switch casing 70 has a cylindrical portion projecting into the casing 71 and this cylindrical portion is provided with a series of circumferentially spaced contacts 72, 73, 74, 75 and 76, the contacts 72, 73 and 76 being engageable by the ends of the contact strip 67 when said contact strip is rotated in one or the other direction, and the contacts 74 and 75 being engageable by the ends of the contacts 63 and 64. The inner end of the switch casing is closed by a disk 77 of suitable insulating material having a pair of contacts 78 and 79 fitted therein in diametrically opposite relation and adjacent to the contacts 74 and 75 respectively, and the outer end of the switch casing has a pair of contacts 80 and 81 fitted therein in diametrically opposite relation and adjacent to the contacts 74 and 75 respectively. When the switch member 60 occupies its normal position within the switch casing as shown in Fig. 3, the sides of the contacts 63 and 64 will engage the end contacts 78 and 79 and also the contacts 74 and 75, and when the switch member 60 is shifted axially, the contacts 63 and 64 will remain in engagement with the contacts 74 and 75 but the opposite sides of the contacts 63 and 64 will engage the end contacts 80 and 81 respectively. The ends of the contact 67 will be engageable with the contact 76 and the contact 72 or 73, irrespective of the axial position of the switch member 60 in the switch casing. The contacts 72 and 73 are so located with respect to the rotatable contact 67 that the latter will engage either the contact 72 or 73 when the vane 27 is at the end of its swing in one or the other direction, and the contact 67 will move out of engagement with one or the other of the contacts 72 and 73 and will engage the insulation between them when the vane 27 reaches its middle or neutral position. Also, the contacts 63 and 64 are so located that they will engage the contacts 74 and 75 while the vane 27 is in its middle or neutral position or at the end of its swing in either direction and the contacts 63 and 64 will engage the contacts 78 and 79 or 80 and 81, according to the axial position occupied by the controlling switch member 60.

The contact 74 is connected by a wire 85 to the solenoid 51 of the valve 37, the other terminal of this solenoid being grounded, and the contact 75 is connected by a wire 86 to the solenoid 51ª of the valve 38, the other terminal of this solenoid being grounded. The contact 72 is connected by a wire 87 to the solenoid 51 of the valve 37, and the contact 73 is connected by a wire 88 to the solenoid 51ª of the valve 38. The contact 76 is connected to a wire 89 which supplies current to the contact 72 or 73 to set the valves 37 and 38 to neutralize the device before a gear change is made.

An electromagnet switch, shown in detail in Fig. 11, is provided to insure the return of any gear element to neutral position before a gear change is made, this switch comprising an electromagnet 90 having a core 91 with which an armature 92 on a switch arm 93 cooperates, this switch arm having a contact 94 which is engageable with a contact 95 when the switch tongue 93 is attracted by energizing of the electromagnet 90, and the switch arm 93 has a contact 96 at its opposite side which cooperates with a contact 97 when the switch arm 93 is retracted from the magnet core 91, as occurs when the electromagnet 90 is deenergized, the switch arm 93 being composed of resilient material and having a tendency to normally retract from the electromagnet and to hold the contacts 96 and 97 in engagement, as shown in Fig. 11.

The electromagnet and switch arm just described are contained in a suitable casing 98 located in a suitable position on the automobile and having means for operating it at the will of the driver. According to the present invention, the switch just described is arranged to be actuated by the fuel control element for the automobile engine, as for example, by the accelerator pedal when the latter is rocked rearwardly beyond closed throttle position. The switch is provided for this purpose with a plunger 101 which extends upwardly through the top of the casing 98 and is provided with a button 102 located beneath the rear end or heel engaged portion of the accelerator pedal 99, the latter being mounted to rock on a pivot 99ª so that it may occupy either the normal closed throttle position a shown by the full lines in Fig. 1 or may be rocked rearwardly beyond closed throttle position into the position b indicated by the dot and dash lines in that figure, or it may be rocked forwardly or depressed at its forward end into throttle opening position c as indicated by the dotted lines in Fig. 1. By this arrangement, when the accelerator pedal 99 is rocked rearwardly or depressed at its rear end beyond closed throttle position into the position b, it will engage the button 102 located beneath it and thereby push downwardly the plunger 101. The plunger 101 carries a spring or resilient dog 103 which is engageable with the switch arm 93 when the plunger is depressed and operates to move the switch arm downwardly and thereby engage the contact 94 thereon with the contact 95, and the plunger 101 carries a switch contact 104 which, after the plunger has been depressed to engage the contacts 94 and 95, will bridge a contact 105 connected to the contact 97 and a cooperating contact 106. After the plunger has been depressed sufficiently to bring the contacts 94 and 95 into engagement, the dog 103 will yield and pass the end of the switch arm 93, and further depression of the plunger brings the switch contact 104 into engagement with the contacts 105 and 106. The plunger is normally held yieldingly in its raised position by a spring 107. The accelerator pedal 99 is operatively connected to the throttle 108 in the intake manifold 36 of the automobile engine in any usual or suitable manner, the throttle being shown for example in the present instance as provided with an operating arm 108ª operatively connected by a rod 109 to one arm of a bell crank lever 111 pivotally mounted at 111ª, the other arm of this bell crank lever being operatively connected by a rod 112 to one arm of a bell crank lever 113 pivoted at 113ª, the other arm of this bell crank lever being arranged beneath a plunger 114 pivotally connected to the forward or toe engaging end of the accelerator pedal, so that when the forward or toe end of the accelerator pedal is depressed toward the position c, the connections just described will operate to open the throttle, these connections however permitting the rear or heel engaging end of the accelerator pedal to be depressed beyond the closed throttle position a and into the position b.

100 designates the usual clutch pedal which controls the main clutch connecting the engine of the automobile to the clutch shaft 1 of the transmission, the clutch being of any suitable or usual kind such as commonly used in automobiles. When the clutch pedal occupies its rearmost position A, the clutch will be engaged, thus connecting the engine to the transmission to drive the automobile, and when the clutch is depressed into the position B, the main clutch will be disengaged. The clutch pedal however, according to the present invention, is adapted to be depressed beyond clutch disengaging position into the position C, and in moving beyond clutch disengaged position B into the position C in which the clutch will still be disengaged, the clutch pedal closes a switch 115. One of the contacts of this switch is connected by a wire 110 to the switch arm 93 and the other contact of the switch 115 is connected to one terminal of a source of electric current such as a storage battery D such as commonly carried on automobiles, the other terminal of this battery being grounded on the frame of the automobile, as usual. As will be seen from Fig. 1, the wire 89 is connected to one terminal of the winding of the electromagnet 90, the other terminal of this magnet being connected to the contact 95.

By the arrangement just described, whenever the accelerator pedal 99 is rocked rearwardly beyond closed throttle position, thus depressing its rear or heel engaging end, the switch arm 93 will be depressed, thus engaging the contacts 94 and 95, and upon operation of the clutch pedal 100 beyond clutch disengaging position B into the position C, thus closing the switch 115, the circuit from the battery D will be completed through the contacts 94 and 95 and the winding of the electromagnet 90, to the contact 76, and the current thus supplied to the contact 76 will pass through the contact 67 to the contact 72 or 73, according to the position occupied by the vane 27, assuming that one of the gear changing elements of the transmission mechanism is in operative position, and the current thus supplied to the contact 72 or 73 wil be conducted to the solenoid 51 or 51ª of the valve 37 or 38 and the circuit therethrough completed by grounding, as indicated in Fig. 1. The consequent energizing of the solenoid of one or the other of these valves will establish communication between the casing 28 at one side of the vane and the intake manifold, and the other valve will establish communication between this casing at the other side of the vane and the atmosphere, thus causing the vane to swing in the appropriate direction to its middle or neutral position, at which time the contact 67 will reach the insulation between the contact 72 and 73 and thereby break the circuit just described and interrupt the swing of the vane, the movement of the vane to its middle or neutral position returning whichever gear shifting bar it happens to be connected to to its middle or neutral position. Since the winding of the electromagnet 90 is connected in the same circuit just described, said electromagnet will remain energized and hold the contacts 94 and 95 in engagement until the circuit through the conductor 89 is broken by the passing of the contact 67 out of engagement with the contact 72 or 73, whereupon the electromagnet 90 will become deenergized and the switch arm 93 will spring upwardly, thereby bringing the contact 96 thereon into engagement with the contact 97, which will then be engaged by the switch contact 104, so that a circuit will then be completed to effect the gear change. When the accelerator pedal is returned to its normal closed throttle position a, as shown by the full lines in Fig. 1, the contact 104 is returned to its normal raised position, thereby breaking all circuits connected to the shifting mechanism.

The selecting of the different speed changes is accomplished, according to the present invention, by a selecting switch one form of which is shown in Fig. 1 and is shown in detail in Figs. 7 to 10 inclusive. This switch comprises a casing 116 which is preferably mounted on the steering column of the automobile beneath the usual steering wheel so that it will be within convenient reach of the automobile driver. As shown in Fig. 14, the casing is provided with a clamp 117 for securing it to the steering column 118. The casing 116 contains a cylindrical sleeve 119 of "Bakelite" or other suitable insulating material, this sleeve having a series of electrical contacts 120, 121, 122, 123 and 124 mounted therein and exposed on its inner side. The contacts 121 and 122 are located adjacent to the contact 120, the contacts 121 and 122 being located opposite to one another transversely of the sleeve, and the contacts 123 and 124 have extensions 123ª and 124ª which are arranged in overlapping relation spaced longitudinally of the switch. This switch also comprises a controlling contact 125 which is shiftable longitudinally or axially of the sleeve 119 along a medial path A—A (Fig. 10), which will bring it into bridging engagement with the contacts 120 and 121, and into engagement with the contact extensions 123ª and 124ª, and the contact 125 is also manually movable laterally of such medial line to bring it into bridging engagement with the contact 120 and the contact 121 or 122, or into engagement with the main portion of the contact 123 or 124.

The controlling contact 125 is carried by a cylinder 126 of "Bakelite" or other suitable insulating material which is rotatable and movable axially within the cylindrical sleeve 119. The contact 125 is in the form of a resilient arm which has a tendency to spring outwardly from the periphery of the cylinder 126 and to engage the contacts in the sleeve 119, the contact 125 having an extension 127 which extends longitudinally along the cylinder 126 and is engaged by a relatively fixed contact 131 secured to the sleeve 119 throughout the travel of the contact 125 longitudinally over the contacts 120 and 121 or 122, and the contact extensions 123ª and 124ª, and this extension 127 is sufficiently wide to maintain engagement with the contact 131 when the cylinder 126 is rotated in either direction to engage the contact 125 with either of the contacts 121 and 122 or with the main portions of the contacts 123 and 124.

The cylinder 126 of the selecting switch is movable manually to enable any desired speed changes to be made selectively at the will of the driver. According to the present invention, a shaft 128 is mounted to rotate and shift axially in the casing 116, one end of this shaft being threaded or otherwise fixed to the cylinder 126 at one end, the other end of this shaft being fixed to a head 129 which is notched to form a series of teeth 133, 134 and 135 which are located and spaced axially of the shaft 128 to correspond to the positions of the contact 125 when bridging the contacts 120 and 121 or engaging the contact extensions 123ª and 124ª respectively. The head 129 is provided with a handle 136 by which it may be shifted axially and rotated manually. This handle extends from the interior to the exterior of the casing through a slot which is similar to the H-slot for the conventional hand shifting lever, it having pairs of oppositely positioned notches or branches 137 and 138 and 139 and 140 which extend laterally of the casing 116 and are spaced axially thereof and are connected by a central slot 141, and this slot, according to the construction as shown, is provided with a supplemental notch 142 in longitudinal alinement with the central slot 141. These slots are so arranged that when the handle 136 is moved into the notch 142 the cylinder 126 will occupy its fully retracted position to the left in Figs. 1 and 7, the extension 127 of the contact 125 being then beyond and out of engagement with the contact 131, the device being then set in neutral condition with the circuit for the speed changing mechanism broken at the contact 131, and in order to retain the device in neutral condition, the handle 137 is provided with means for retaining it in the notch 142. For this purpose, the handle 136 is fitted slidably on a stem 143 on the head 129 so that it may be retracted against the action of a tension spring 144 which normally holds the handle in its inner position. The portion of the handle which fits over the stem 143 is of a larger diameter than the width of the notch 142 so that, in order to engage the handle in said notch, the handle must be retracted, whereupon the stem 143 of the handle will be movable into the notch 142 and the tubular outer portion of the handle surrounding the stem will rest on the exterior of the casing, and the casing is provided at opposite sides of the notch 142 with a pair of projections 145 to enter a pair of recesses or notches 146 formed in the inner end of the sleeve-like portion of the handle. The handle may then be moved into the neutral notch 142 by retracting the handle against the action of the spring 144 and will be retained in neutral position by the cooperation of the projections 145 and 146, and the handle may be released and removed from the notch 142 by retracting it to disengage the projections 145 from the notches 146. The notch 137 into which the handle 136 is movable to select reverse is also preferably narrower than the outer portion of the handle 136 which fits over the stem 143, so that the handle will not be movable accidentally into reverse but can be moved into reverse position only by retracting its outer sleeve-like portion so that the stem portion 143 of the handle will move into the notch 137 while the surrounding tubular portion thereof will rest on the outer side of the casing. The notches 138, 139 and 140 into which the handle is set to select first, second and third speeds respectively are however sufficiently wide to accommodate the outer tubular portion of the handle 136 so that the handle will be movable without obstruction into any of these notches for the selection of the speed changes selectively or in any desired order. In order to yieldingly retain the handle 136 in any one of the notches 137, 138, 139 and 140 or in a middle position for movement longitudinally through and in alinement with the central notch 141, the shaft 128 is provided with a central and two lateral grooves 147 with which a spring pressed ball 148 cooperates, these grooves extending longitudinally of the shaft 128 and being so disposed around its periphery that the ball 148 cooperating therewith will retain the handle either in a central position for movement longitudinally in alinement with the central notch 141 or in a position at either side thereof as when engaged with either of the notches 137 and 139 or 138 and 140.

The present invention provides means controlled by successive actuations of a power controlling element of the automobile, such as the main clutch pedal or the accelerator pedal, or by both of such pedals operating conjointly, to automatically select the speed changes progressively from first speed through an intermediate speed or speeds to high speed. Such means as shown in Figs. 1 to 14 inclusive comprises a solenoid embodying a winding 150 contained within an enlargement of the sleeve 119 in the casing 116, and a solenoid core 151 which is reciprocable within the solenoid winding in response to the energizing and deenergizing thereof. The solenoid core is retracted by a spring 152 when the solenoid is deenergized, the solenoid core having a stem 153 of brass or other non-magnetic metal threaded or otherwise secured to it and having an enlargement 154 which will serve as a stop to limit the retracting movement of the solenoid core. The stem 153 has a pair of resilient pawls 155 composed of brass or other non-magnetic metal threaded into it or otherwise attached thereto, these pawls being turned outwardly and having a normal tendency to spread apart, these pawls being arranged to reciprocate in a core 156 formed axially within the cylinder 126. The bore 156 is provided with a pair of circumferentially extending grooves 157 and 158 which are spaced apart axially a distance equal to the spacing of the teeth 133 and 134 on the head 129 so that successive energization of the solenoid will reciprocate the pawls 155 successively to advance the cylinder 126 step by step through a distance at each step equal to the distance apart of the teeth on the head 129, the pawls 155 disengaging from the groove 157 and engaging in the groove 158 during their return stroke under the action of the spring 152. A compression spring 159 is mounted between the forward end of the cylinder 126 and the respective end of the sleeve 119, this spring being compressed when the cylinder 126 is advanced and serving to restore the cylinder to its initial position when the cylinder is released. The cylinder 126 is retained in the successive positions to which it is advanced by successive actuations of the solenoid core 151 by a latch 260 which is pivoted in the casing 116 on the pivot pin 261, the latch having a ratchet pawl 262 thereon which is bevelled and engageable successively with the teeth on the head 129 as the cylinder 126 is advanced. The pawl 262 of the latch is pressed yieldingly into operative relation with the teeth on the head 129 by a spring 263. The latch is provided with a handle or knob 264 which is exposed exteriorly of the casing 116 and provides means for manually disengaging the pawl from any tooth on the head 129, thereby releasing the cylinder 126 for return to its initial position under the action of the spring 159.

Figure 18:
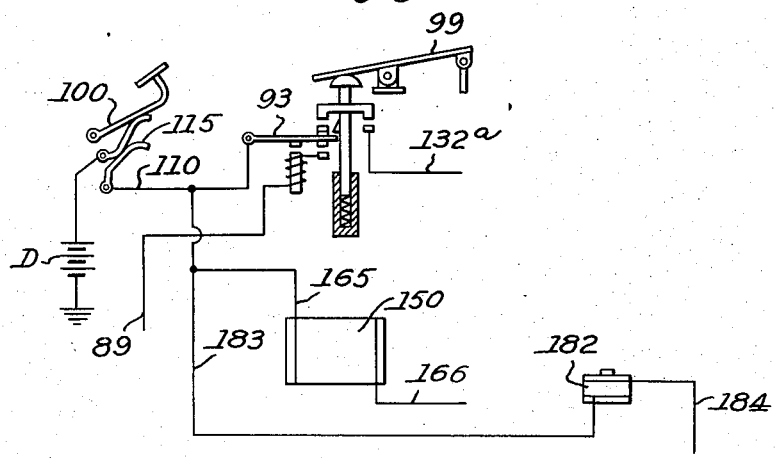
Fig. 18 is a view similar to Fig. 17, but showing an arrangement in which the speed changes are controlled by the clutch pedal only.

In the present instance, the solenoid which advances the cylinder 126 is controlled by the conjoint operation of the accelerator pedal 99 and clutch pedal 100. For this purpose, one terminal of the solenoid winding 150 is connected by the wire 165 to the contact 95 which is engageable by the contact 94 of the switch arm 93 when the rear or heel engaging portion of the accelerator pedal 99 is depressed, and since the switch arm 93 is connected to the battery or source of electric current D through the switch 115 which is closed by the clutch pedal 100 when this pedal is depressed beyond clutch disengaging position into the position C, it will be seen that the closing of the circuit of the solenoid winding 150 will be dependent upon the depression of the rear or heel engaging end of the accelerator pedal beyond closed throttle position and depression of the clutch pedal beyond clutch disengaging position. However, if desired, the energizing of the solenoid winding 150 may be controlled only by the accelerator pedal 99, as or example when the automobile is equipped with a free wheeling unit which does not require disengagement of the main clutch to effect the speed changes, by omitting the clutch pedal controlled switch 115 and connecting the wire 110 directly to the battery D and the wire 183 to the contact 95, as shown in Fig. 17, or the energizing of the solenoid winding 150 may be controlled only by the clutch pedal 100 by connecting the wire 165 directly to the wire 110 instead of to the contact 95, as shown in Fig. 18, in which case the clutch controlled switch 115 alone would control the energizing of the solenoid winding 150.

The present invention also provides means responsive to the travelling movement of the automobile for controlling the energizing of the solenoid winding 150 in order to prevent actuation of the selecting switch by careless operation of the accelerator pedal. For this purpose, the other terminal of the solenoid winding 150 is connected by a wire 166 to a contact 167 mounted adjustably in an insulated bushing in a casing 168. This casing contains a device which is responsive to the traveling movement and speed of the automobile, such device being preferably in the form of an ordinary ball governor 169 which comprises centrifugally acting balls 169ª mounted on flexible links 169ᵇ mounted on a shaft 170, this shaft being mounted in suitable bearing 171 in the casing 168. The shaft 170 is preferably connected to the same shaft 172 which is driven at a speed corresponding to that of the automobile and serves to drive the usual speedometer 173 in the usual and well known way, the shaft 171 being provided at its ends for this purpose with couplings 174 adapted to be coupled to sections of the speedometer driving shaft 172. The governor has a collar 175 which is connected to the links 169ᵇ and slidable vertically on the shaft 170 in response to rotation of the governor, and a switch lever 176 is pivoted and grounded in the casing 168 on a pivot pin 177, the casing 168 being grounded on the automobile frame as indicated in Fig. 1. The switch arm 176 carries a contact 178 at one end and the other end of this switch arm is held in engagement with the governor collar 175 by a tension spring 179. The switch lever 176 is so arranged that when the automobile is at a standstill, or its speed is below, for example, five miles per hour, the collar 175 will be in its lower position and the contact 178 will be out of engagement with the contact 167, thus holding the circuit for the solenoid winding 150 open. When however the automobile is in motion and has attained a predetermined speed, as for example about five miles per hour, the collar 175 of the governor will rise on the shaft 170 under the action of the governor sufficiently to allow the spring 179 to engage the contact 178 with the contact 167, thereby completing the ground to the solenoid winding 150 so that the latter may be energized from the battery D under control of the accelerator pedal, or the clutch pedal, or both.

The present invention also provides means controlled by a power controlling element of the automobile, preferably the main clutch pedal as shown, for automatically disengaging the latch 260 from the head 129 thus releasing the selecting switch for restoration to its initial first or low speed position. For this purpose the latch 260 is provided with an armature 180 arranged to cooperate with the core 181 of an electromagnet contained within the casing 116 the winding 182 of this magnet having one of its terminals connected by a wire 183 to the wire 110 so that its connection to the battery D will be controlled by the clutch pedal operated switch 115 and this magnet is preferably so controlled that it will not be energized to retract the latch 260 unless the speed of the automobile is reduced below a predetermined speed as for example five miles per hour or until the automobile is stopped. For this purpose the other terminal of the magnet winding 182 is connected by a wire 184 to a contact 185 which is adjustably mounted in an insulating bushing in the casing 168 of the speed responsive device in a position to be engaged by the contact 178 on the switch arm 176 under the action of the collar 175 of the governor when said collar is lowered under the action of the governor to a predetermined point, engagement of the contacts 178 and 185 then completing the grounding of the magnet winding 182 so that the latter may be energized by depression of the clutch pedal 100 beyond clutch disengaging position and into the position C, thus closing the switch 115.

The contacts of the selecting switch are connected to the appropriate contacts of the controlling switch operated by the shaft 23 to effect the different desired speed changes. As shown in Figs. 1, 7 and 10, the contact 120 of the selecting switch is connected by a wire 160 to the solenoid 55 which, when energized, shifts the actuating member to disconnect it from the shifting bar 16 and connect it to the shifting bar 14, the other terminal of this solenoid being grounded, as shown. The contact 121 of the selecting switch is connected by a wire 161 to the contact 81, the contact 122 is connected by a wire 162 to the contact 80, the contact 123 is connected by a wire 163 to the contact 78, and the contact 124 is connected by a wire 164 to the contact 79. The terminal 132 connected to the contact 131 is connected by a wire 132ª to the contact 106.

The operation of a speed changing device constructed as hereinbefore described is as follows.

Assuming the handle 136 to be normally retained in the notch 142 by the projections 145, at which time the extension 127 of the contact 125 will be beyond the contact 131 or toward the left of said contact as viewed in Figs. 1 and 7 so that the contact 131 will rest on the insulating portion of the cylinder 126, the gear changing elements of the transmission will be in neutral condition. In order to set the device for first speed, the handle 136 is disengaged from the retaining projections 145 and withdrawn from the notch 142, allowing the latch 260 to engage the tooth 133 on the head 129, and this movement of the handle 136 will advance the cylinder 126 to bring the contact 125 thereon into bridging engagement with the contacts 120 and 121, the contact 125 being sufficiently wide for this purpose. The selecting switch is then in condition for operation to select the speed changes.

Assuming that the speed changes are to be made automatically under control of the power controlling element or elements of the automobile and that the automobile is to be started from a standstill, the clutch pedal 100 is depressed beyond clutch disengaging position into the position C, thereby closing the switch 115. The closing of the switch 115 completes the circuit from the battery D through wires 110, 183 through the winding 182 of the latch releasing magnet, wire 184, contacts 185 and 178 to ground, thereby energizing the magnet winding 182 and releasing the latch 260. However, since the wider or sleeve portion of the hand lever 136 rests at this time against the opening in the narrow notch 142, no operation takes place until the accelerator pedal is operated. Depressing of the rear end or heel engaging portion of the accelerator pedal 99 beyond closed throttle position into the position b will depress the plunger 101, thereby bringing the switch arm 93 into a position to engage the contact 94 thereon with the contact 95. Since the circuit for the winding 150 of the solenoid for advancing the selecting switch will be open at this time by the disengagement of the contact 178 from the contact 167, the selecting switch will not be advanced, and since the transmission at this time is in neutral, the contact 67 rests on the insulation between the contacts 72 and 73, the engaging of the contact 94 with the contact 95 connected to the magnet winding 90 will not complete the circuit through this magnet, so that the switch arm 93 will be tripped as the plunger 101 descends and will return to its raised position to bring the contact 96 thereon into engagement with the contact 97, and such further descent of the plunger 101 brings the contact 104 into bridging relation with the contacts 105 and 106. Assuming the clutch pedal 100 to be depressed sufficiently to close the switch 115, current will then flow from the battery D through this switch, wire 110, switch arm 93 and engaged contacts 96 and 97, contacts 104 and 106 and conductor 132ª to contact 125. Since the contact 125 bridges the contacts 120 and 121, current will flow from contact 125 to contact 120 thence to conductor 160 to solenoid 55, energizing the latter so that it will shift the actuating member 20 out of engagement with the shifting bar 16 and connect it with the shifting bar 14. Current will also flow from the conductor 125 to contact 121 thence through wire 161 to contact 81 which will be engaged by the contact 64 after the actuating member has been brought into engagement with the shifting bar 14, and the current will then pass from the contact 64 to the contact 75 and then by conductor 86 to the solenoid 51ª of the valve 38, thereby causing this valve to shift into a position to establish communication between the right hand side of the casing 28 and the intake manifold 36 of the engine, the solenoid 51 of the valve 37 at this time being deenergized so that this valve will establish communication between the opposite end of the vane casing 28 and the atmosphere. In consequence, air at atmospheric pressure entering the left hand side of the vane casing will act to swing the vane 27 into its right hand position shown in Fig. 1, thereby operating the actuating member 20 to shift the bar 14 in a direction to mesh the gear 8 with the first speed gear 5. The clutch pedal 100 may then be allowed to rise to its position A, thereby engaging the main clutch, and the accelerator pedal 99 may be depressed at its forward end to open the throttle and start and accelerate the automobile in first speed.

As the speed of the automobile accelerates, the collar 175 on the governor 169 rises, thereby allowing the contact 178 on the switch arm 176 to engage the contact 167 which completes the ground side of the circuit for the winding 150 of the solenoid which advances the selecting switch, and this movement of the switch arm 176 disengages the contact 178 from the contact 185, thereby opening the ground side of the circuit for the winding 182 of the latch releasing magnet.

Second speed is obtained automatically by allowing the accelerator pedal 99 to return to closed throttle position, then depressing the clutch pedal 100 to disengage the main clutch and close the switch 115 and then rocking the rear or heel engaging end of the accelerator pedal downwardly beyond closed throttle position thereby depressing the plunger 101. Current will then flow from the battery D through the closed switch 115, conductor 110, switch arm 93, which is depressed by the dog 103 of the plunger 101, contacts 94 and 95, electromagnet winding 90, conductor 89 and to the contact 76. Current will also flow from the contact 95 through conductor 165, solenoid winding 150, conductor 166, through engaged contacts 167 and 178 to ground, thereby energizing the solenoid winding 150, causing its core 151 to reciprocate the pawls 155, then engaged with the groove 157, to the right in Figs. 1 and 7, thereby advancing the cylinder 126 a step, thus removing the contact 125 from the contacts 120 and 121 and engaging it with the contact 123. The disengagement of the contact 125 from the contact 120 deenergizes the solenoid 55 so that the actuating member 20 may disengage from the shifting bar 14 and engage the shifting bar 16 under the influence of the spring 21 when the bar 14 reaches its middle position and the gear 8 has been restored to neutral. Assuming that the transmission had been previously set for first speed, the contact 67 will rest on the contact 72, and current will then flow from the contact 76 through contact 67, contact 72 and conductors 87 and 85 to the solenoid 51 of valve 37, thereby shifting the piston of this valve into a position to establish communication between the left hand side of the vane casing 28 and the intake manifold, the solenoid of the valve 38 at this time being deenergized so that this valve will be in a position to admit air at atmospheric pressure to the right hand side of the vane casing 28. Air at atmospheric pressure will thus enter the vane casing and swing the vane 27 toward the left in Fig. 1 until it reaches its middle position, at which time the contact 67 passes off the contact 72, thus breaking the circuit through the solenoid 51 of the valve 37 and thereby interrupting communication of the left hand side of the casing 28 with the intake manifold and establishing communication between this side of the casing and the atmosphere, so that the swing of the vane 27 will be thereby interrupted at its middle or neutral position. Disengagement of the contact 67 from the contact 72 will also break the circuit through the winding of the electromagnet 90, thereby releasing the switch arm 93 and allowing it to swing upwardly to engage the contact 96 thereon with the contact 97, the dog 103 having yielded and passed beneath the contact arm 93 during the descent of the plunger 101 and the contact 104 brought into bridging engagement with the contacts 105 and 106, and current from the battery D will then flow from the switch arm 93 through contacts 96, 97, 104, 105 and 106, through conductor 132ª to contact 125 thence to contact 123 and through conductor 163 to contact 78 and from the latter, through contact 63 to contact 74, and from the latter through conductor 85 to solenoid 51 of valve 37, thereby setting the piston of this valve in position to establish communication between the left hand side of the vane casing 28 and the intake manifold, the solenoid 51ª of the valve 38 being then deenergized, so that air at atmospheric pressure may then enter the right hand side of the vane casing 28 and cause the vane 27 to swing to the left hand side of its casing, thereby swinging the actuating member 20 in a direction to reciprocate the shifting bar 16 in a direction to engage the gear 10 connected thereto with the second speed gear 6. The release and upward swing of the switch arm 93 to carry the contact 94 thereon out of engagement with the contact 95 breaks the circuit through the solenoid winding 150, thereby deenergizing this solenoid and allowing the spring 152 to retract the pawls 155 from the groove 157 and to engage these pawls in the groove 158, the switch cylinder 126 being retained in its second speed position by engagement of the latch 260 with the tooth 134. After the transmission has been set for second speed, the clutch pedal 100 may be permitted to return to clutch engaging position, thereby opening the switch 115, and the accelerator pedal 99 may be rocked forwardly to open the throttle of the engine and thereby accelerate the automobile.

Third speed is obtained automatically by allowing the accelerator pedal to return to closed throttle position, then depressing the clutch pedal 100 past clutch disengaging position to close the switch 115, and then rocking the rear or heel engaging portion of the accelerator pedal 99 downwardly, thereby depressing the plunger 101 and causing the dog 103 thereon to depress the switch arm 93 to bring the contact 94 thereon into engagement with the contact 95, after which the dog 103 yields and passes downwardly below the arm 93 and the contact 104 is brought into bridging engagement with the contacts 105 and 106. Current will then flow from the contact 94 through the solenoid 150 and engaged contacts 167 and 178, energizing this solenoid and causing the pawls 155 then engaged in the groove 158 to advance the switch cylinder 126 another step to bring the contact 125 into engagement with the contact 124, where it is held by engagement of the latch 260 with the tooth 135. Since the contact 125 will then be out of engagement with the contact 120, the solenoid 55 will be deenergized so that the actuating member will be in engagement with the shifting bar 15 under the influence of the spring 31. Current will then flow from the battery D through closed switch 115, conductor 110, switch arm 93, engaged contacts 94 and 95, electromagnet winding 90, conductor 89 to contact 76, and as the transmission was previously set for second speed, the contact 67 will then engage the contact 73, so that current will flow through the contacts 76, 67 and 73 and through conductors 86 and 88 to the solenoid 51ª of the valve 38, thereby operating the piston of this valve to establish communication between the right hand side of the vane casing 26 and the intake manifold, the solenoid 51 of the valve 37 at this time being deenergized so that this valve will establish communication between the left hand side of the vane casing 28 and the atmosphere. Air at atmospheric pressure will then enter the left hand side of the casing 28 and will cause the vane 27 to swing from that side of the casing toward the right until the contact 67 disengages from the contact 73, whereupon the circuit through the solenoid 51ª will be broken and this valve will return to its normal position to establish communication between the right hand side of the casing 28 and the atmosphere, the vane 27 being thus caused to come to rest in its middle position, the shifting bar 16 being then in neutral position. The breaking of the circuit by the passing of the contact 67 from engagement with the contact 73 also breaks the circuit through the winding of the electromagnet 90 so that the switch arm 93 then swings upwardly, bringing its contact 96 into engagement with the contact 97, and current will then flow from the battery through the closed switch 115, conductor 110, switch arm 93, contact 96 and 97, 104, 105 and 106 and through the conductor 132ª to the contact 125 and from the latter to contact 124, then through conductor 164 to contact 79, and the current passes from the latter contact through contact 64 to contact 75 thence by conductor 86 to the solenoid 51ª of the valve 38, thereby operating the piston of this valve to establish communication between the right hand side of the vane casing 28 and the intake manifold, the solenoid 51 of the valve 37 being then deenergized so that this valve will establish communication between the left hand side of the casing 28 and the atmosphere. Air at atmospheric pressure will then enter the left hand side of the casing 28 through the valve 37 and will thereby swing the vane 27 to the right hand side of the casing 28, thereby shifting the bar 16 to cause the gear 10 connected thereto to shift in a direction to engage the third or high speed clutch members 11 and 12. The upward swing of the switch arm 93 which disengages the contacts 94 and 95 breaks the circuit through the solenoid winding 150, thereby deenergizing this solenoid and allowing the spring 152 to return the core 151 to retracted position, at which time the pawls 155 will be retracted beyond the grooves 157 and 158 and will engage smooth or ungrooved portions of the wall of the bore 156. After the transmission has been set for third or high speed, the clutch pedal 100 may be allowed to return as usual to clutch engaging position, thereby opening the switch 115, and the accelerator pedal may be rocked forwardly to open the throttle of the engine for acceleration and driving.

As the movable contact carrying cylinder 126 of the selecting switch is advanced each step by successive actuations of the solenoid, the selecting switch is operated automatically to select the speed changes progressively from first or low speed through a second or intermediate speed to third or high speed, and the movable contact carrying cylinder 126 will be automatically retained, at each step in its advance, by the successive engagement of the latch 260 with the teeth 134 and 135 on the head 129, and when the selecting switch has been advanced into third or high speed position it will be retained in that position by engagement of the latch 260 with the tooth 135 until released by operation of the latch 260. This latch may be released manually by lifting the projecting knob or handle 264 thereon, thereby moving the pawl 262 into disengaged relation with the head 129, whereupon the spring 159, which was compressed by the advance of the cylinder 126, will return the cylinder 126 to its initial or first speed setting, its return movement being arrested by the engagement of the wider portion of the hand lever 136 at the entrance of the notch 142. The present invention also provides means for operating the latch 260 to release the selecting switch for return to its initial or first speed position under control of the clutch pedal when the speed of the automobile is reduced below a predetermined speed, as for example five miles per hour, or the automobile is stopped. The setting of the latch for such automatic release is accomplished by the governor 169, the collar 175 of which will descend when the speed of the automobile is reduced below a predetermined speed or the automobile is stopped, thereby causing the contact 178 to engage the contact 185 thereby grounding one terminal of the magnet winding 182, and since the other terminal of the magnet winding 182 is connected by the conductors 110 and 183 to the battery D through the clutch controlled switch 115, depression of the clutch beyond clutch disengaging position and into the position C, which closes the switch 115, will complete the circuit through the winding 182 of the latch releasing magnet, thereby retracting the latch 260 and releasing the head 129 so that the movable contact carrying cylinder 126 of the selecting switch may return automatically to its initial or first speed position under the influence of the spring 159.

The speed changes may be made selectively or in any desired order manually or independently of the automatic means hereinbefore described. The manual selection of the speed changes is accomplished by manipulation of the hand lever 136. By rocking this hand lever laterally into the notch 138, the contact 125 is engaged with the contact 121 while bridging also the contact 120 controlling the solenoid 55, and by rocking the rear or heel engaging end of the accelerator pedal 99 downwardly and depressing the clutch pedal 100 beyond its clutch disengaging position to close the switch 115, the speed changing operation will be performed in the same manner hereinbefore described by the circuits connected to the contacts 120 and 121 and the contacts operated by the plunger 101, with the exception that the solenoid core 151 will operate idly, and similarly, by engaging the hand lever 136 in the notch 139 or 140 in the casing 116, the contact 125 will be engaged with the contact 123 or 124 respectively, and by rocking the rear or heel engaging portion of the accelerator pedal 99 downwardly and depressing the clutch pedal 100 beyond clutch disengaging position to close the switch 115, the speed changing mechanism will operate to set the transmission in second or third speed through the circuits connected to the contacts 123 and 124 in the same manner as hereinbefore described, with the exception that the solenoid core 151 will operate idly. When the hand lever 134 is set in any one of the notches 138, 139 and 140, it will be retained therein until manually released therefrom, thereby maintaining the transmission set for any desired speed. Setting of the selecting switch for any desired lower speed is accomplished by the hand lever 136 after release thereof by retraction of the latch 260, either manually or by operation of the clutch pedal.

The transmission is set for reverse by swinging the hand lever 136 laterally into the reverse notch 137 after pulling the sleeve-like portion of this lever upwardly to permit the stem 143 to enter this narrow notch and allowing the accelerator pedal to return to closed throttle position, then depressing the clutch pedal 100 beyond clutch disengaging position and into the position C which closes the switch 115, and then depressing the rear or heel engaging portion of the accelerator pedal 99 downwardly below closed throttle position. When the hand lever 136 is in the notch 137, the contact 125 will bridge the contact 120 and the contact 122, depression of the rear or heel engaging portion of the accelerator will cause the dog 103 thereon to depress the switch arm 93 to engage the contacts 94 and 95, after which the dog 103 yields and passes the switch arm 93, and such operation also brings the contact 104 into bridging engagement with the contacts 105 and 106. The engagement of the contacts 94 and 95 completes the circuit through the magnet 90 which is connected by the conductor 89 to the contact 76 but if the transmission happens to be in neutral condition, as would be usually the case, this circuit will be open where the contact 67 rests on the insulation between contacts 72 and 73 but if the transmission is set for any forward speed, the solenoid 51 of the valve 37 or the solenoid 51ª of the valve 38 will be energized to cause return of the vane 27 to its middle or neutral position. Assuming that the transmission is in or has been returned to neutral condition, current will flow from the battery D through the closed switch 115, conductor 110, switch arm 93, contacts 104, 105 and 106, through conductor 132ª to contact 125, and since the latter bridges the contacts 120 and 122, the solenoid 55 will be energized through the conductor 160 connected to contact 120, thereby engaging the actuating member 20 with the shifting bar 16, and current will pass from the contact 122 through the conductor 162 to contact 80 and from the latter through the contact 63 to contact 74 and from the latter, through conductor 85, to the solenoid 51 of the valve 37, thereby energizing the solenoid of this valve and causing its piston to shift into a position to establish communication between the left hand side of the vane casing 28 and the intake manifold, the solenoid 51ª of the valve 38 being then deenergized so that this valve will establish communication between the right hand side of the vane casing 28 and the atmosphere. Air at atmospheric pressure will then enter the right hand side of the vane casing 28 and swing the vane 27 toward the left in Fig. 1, thereby shifting the bar 14 to bring the gear 8 into mesh with the reverse gear 9.

The transmission is set in neutral condition by retracting the outer portion of the handle 136 against the action of the spring 144 and moving the stem 143 into the narrow notch 142, thereby moving the cylinder 126 into a position where the contact 127 is beyond or out of engagement with the contact 131. Such disengagement of the contact 127 from the contact 131 disconnects the movable or controlling contact 125 from the battery D. If the transmission happens to be set for any speed, depression of the clutch pedal 100 beyond clutch disengaging position to close the switch 115 while the accelerator pedal is in closed throttle position, and subsequent depression of the rear end or heel engaging portion of the accelerator pedal 99 downwardly beyond closed throttle position will cause current to flow from the battery D through the closed switch 115, conductor 110, switch arm 93, contacts 94 and 95 which are then engaged, and through the winding of the solenoid 90, conductor 89 to the contact 76 and from the latter through the contact 67 to the contact 72 or 73, according to which gear is engaged, to the solenoid of the respective valve 37 or 38, thereby causing the vane 27 to swing to its middle position and then stop upon disengagement of the contact 67 with the contact 72 or 73, thereby restoring the engaged gear to neutral.

It is to be understood that, whether the selecting switch is operated automatically under the influence of its actuating solenoid to effect the speed changes progressively or is operated manually, the device is restored automatically to neutral condition before any speed change is made, restoration of the transmission to neutral condition prior to any speed change being insured by the holding magnet 90 which maintains the neutralizing circuit closed and holds the speed changing circuit open until after the transmission has been brought to neutral condition, whereupon the circuit closed by the selecting switch to effect a speed change is completed.

Instead of shifting the actuating member 20 to disconnect it from the shifting bar 16 and connect it to the shifting bar 14 by the direct action of a solenoid, as hereinbefore described, fluid pressure operated electromagnetically controlled means such as shown in Fig. 12 may be employed. As shown in this figure, the shaft 23ª connected to the actuating member 20 and corresponding to the shaft 23 previously described has a piston 190 fixed thereon, this piston being mounted to reciprocate in a fluid pressure cylinder 191, one end of which is closed by a switch like that shown in Figs. 3, 4, 5 and 6, the parts of which are designated by the same reference characters as in those figures, the controlling member 60 of this switch being fixed to the shaft 23ª, this switch being connected in the circuits and operating as already hereinbefore described. The cylinder 191 has a port 192 in a side thereof which is adapted to be connected to a pipe 193 connected to the intake manifold of the automobile engine, through a circumferential port 194 in a valve 195, this valve reciprocating in a bore 196 the side of which has an atmospheric port 197 which is adapted to be put into communication with the cylinder by the valve 195 when the latter is in its normal position. The valve 195 has a solenoid core 198 which operates in a solenoid 199, so that when this solenoid is energized, the valve 195 will be retracted, thereby establishing communication between the pipe 193 and the port 192 through the port 194 in this valve, thereby establishing a vacuum pressure in the cylinder 191 which will cause the shaft 23ª to shift axially and thereby disconnect the actuating member 20 from its normal engagement with the shifting bar 16 and to connect it with the shifting bar 14. When the solenoid 199 is deenergized, the valve 195 will be returned to its normal position under the action of a spring 200, thereby interrupting communication of the port 192 with the pipe 193 and establishing communication between the port 192 and the atmospheric port 197, through the port 194 in the valve, whereupon the spring 31 will act to return the actuating member 20 to its normally engaged relation with the shifting bar 16. The solenoid 199 employed in this embodiment of the invention may be connected in the circuit in the same manner in which the solenoid 55 previously described is connected, and the fluid pressure operated device shown in Fig. 12 will operate in the same manner as hereinbefore described with respect to the solenoid 55, with the exception that the shifting of the actuating member into engagement with one or the other of the shifting bars will be effected by fluid pressure under the control of the solenoid instead of being effected directly by the power of the solenoid itself.

Instead of operating the selecting switch by successive actuations of a solenoid, as hereinbefore described, this switch may be operated mechanically by successive actuations of a power controlling element of the automobile. Fig. 15 shows such an arrangement in which the selecting switch is operated to automatically select the speed changes progressively by successive actuations of the main clutch pedal. In this embodiment of the invention, in which parts corresponding with those hereinbefore described are designated by reference characters which are primed, the casing for the parts of the selecting switch is composed of two parts 116' and 116". The part 116' of the casing is constructed like the casing 116 hereinbefore described, with the exception that the selecting switch is contained in the part 116" of the casing and the actuating solenoid is omitted. The handle or lever 136' for manually operating the selecting switch is employed, it being fixed to the shaft 128' which is rotatable and shiftable axially in the casing section 116', the lever or handle 136' being movable selectively into any of the notches which are formed in the casing 116' like the notches 137, 138, 139, 140 and 142 shown in Fig. 14, and the handle or lever 136' being also shiftable longitudinally in alinement with the central notch or slot 141 and adapted to be releasably retained in its different advanced positions by a latch 260' releasable manually by lifting the knob 264' or electromagnetically by the electromagnet comprising the core 181' and 182'. The shaft 128' is provided with a compression spring 159' which serves to restore it to its initial or first speed position.

The casing section 116' is preferably secured to the steering column immediately below the usual steering wheel, as by a clamp 117 shown in Fig. 14, and the casing section 116" is secured to the steering column preferably at a point below the floor of the automobile. These casing sections are connected by a tubular conduit 201 which contains a shaft 202 which is rotatable and shiftable axially therein and connected at its upper end by a flexible shaft 203 and coupling 204 to the shaft 147'. The lower end of the shaft 202 is fixed to a shaft 128" which is rotatable and shiftable axially in the casing section 116" and is provided with longitudinally extending grooves 147" spaced circumferentially thereof and adapted to cooperate with a spring pressed pawl 148" for yieldingly retaining the shaft 128" in the different positions into which it may be rotated.

The lower end of the shaft 128" is fixed to a cylinder 126' which is slidable and rotatable in an insulating sleeve 119' in the casing section 116". The sleeve 119' is provided in a side thereof with a series of contacts 120', 121', 122', 123' and 124' which are arranged like the contacts shown in Fig. 10, and these contacts are adapted to be connected in the circuits shown in Fig. 1 by the conductors shown connected to these contacts and bearing designations corresponding with the conductors shown in Fig. 1. The cylinder 126' carries a contact 125' and an extension 127' thereof corresponding with the contact 125 and extension 127 previously described, and the sleeve 119' has a contact 131' connected thereto at 132' and adapted to be connected to the designated conductor in the circuit of Fig. 1, the contact 131' cooperating with the contact extension 127'. The interior bore 156' of the cylinder 126' is provided with circumferential grooves 157' and 158' which are spaced axially therein a distance corresponding to the spacing of the teeth on the head 129', and a pair of yieldable pawls 155' which have a normal tendency to spring outwardly, are arranged to cooperate with these grooves. The pawls 155' are carried by a plunger 151' which is mounted slidably in the lower end of the casing section 116" so that it will reciprocate the pawls 155' axially within the sleeve 126', this plunger having a spring 152' for retracting it and a pin 154' operating in a longitudinal slot therein for limiting the reciprocation of the plunger in each direction.

The main clutch pedal of the automobile, designated 100' in Fig. 15, which is adapted to occupy either the clutch engaged position A, the clutch disengaged position B or the position C beyond clutch disengaged position, is provided with suitable means, such as an extension 100" thereon to bear on and actuate the plunger 151'. By this arrangement, each actuation of the clutch pedal to the position C will impart an upward stroke to the plunger 151', thereby causing the pawls 155', cooperating with the grooves 157' and 158', to advance the sleeve 126' by successive steps to engage the moving contact 125' with the contacts in the sleeve 119' to select the speed changes progressively in the same manner hereinbefore described with respect to the operation of the selecting switch by the solenoid 150, the switch being retained in its successive positions by the latch 260' and this latch being releasable manually or by the magnet 181', 182' in the same manner as hereinbefore described respecting these parts, the movements of the switch cylinder 126' under the action of the clutch pedal operated plunger being communicated to the shaft 128' and toothed head 129' by the shafts 202 and 203. When the toothed head 129' is released by retraction of the latch 260', the parts, including the switch cylinder 126', are restored to initial or first speed position under the action of the spring 159'. In this embodiment of the invention, the selecting switch may be operated manually by the lever or handle 136' to select the speed changes selectively or in any desired order in the same manner hereinbefore described with respect to the handle or lever 136, the rotative movements of the handle or lever 136' as well as the axial movements thereof being communicated to the switch cylinder 126' by the shafts 202 and 203.

Instead of actuating the plunger of the selecting switch shown in Fig. 15 by the main clutch pedal, it may be actuated by the accelerator pedal, such an arrangement being shown in Fig. 16 which illustrates the lower end of the structure shown in Fig. 15 in which the accelerator pedal 99' is arranged to lift or actuate the plunger 151' each time the accelerator pedal is rocked rearwardly beyond closed throttle position into the position b, the construction and operation of the selecting switch being otherwise the same as in Fig. 15. This embodiment of the invention in which the selecting switch is advanced by successive actuations of the accelerator pedal beyond its closed throttle position is especially advantageous when applied to an automobile equipped with hydraulic clutches or a planetary transmission or with a so-called freewheeling unit which enables the speed changes to be made without the necessity of disengaging the main clutch, so that the speed changes may be made under the entire control of the accelerator pedal.

In this embodiment of the invention, the lower end of the casing 116 on the steering column, which casing and its associated parts are otherwise constructed as shown in Fig. 15, is provided with a transverse guide 116" below the plunger 151', in which a bar 216 slides, this bar having a wedge or cam 217 on its upper side arranged to engage the lower end of the plunger 151' and impart an upward stroke thereto each time said bar is shifted in one direction by the rearward or downward rocking of the rear or heel engaging end of the accelerator pedal 99', said bar being arranged to be actuated by the accelerator pedal for such purpose by a bell-crank lever 218 pivoted on a stationary pivot pin 219 and having one arm thereof pivotally connected to the bar 216 and its other arm carrying a pin 220 mounted adjustably thereon and located below the rear or heel engaging end of the accelerator pedal to be engaged thereby at its upper end, the lower end of the pin 220 being in alinement with and located above the spring-retracted plunger 101. The accelerator pedal is connected to the engine throttle by the same means shown in Fig. 1.

In this arrangement, the cam 217 will be returned to be held in retracted position, as shown, by the spring 107 of the plunger 101 while the accelerator pedal 99' occupies its normal closed throttle position a, the plunger 151' being then retracted as shown in Fig. 15, but each time the rear or heel engaging end of the accelerator pedal is rocked rearwardly or downwardly into the position b, it actuates the plunger 101 of the circuit selecting switch and it also actuates the bar 216 to impart an upward stroke to the plunger 151' to advance the switch cylinder 126' a step, so that successive rearward rocking movements of the accelerator pedal will advance the switch cylinder 126' by successive steps to select the speed changes progressively, as described in connection with Fig. 15. Release of the switch cylinder 126' to allow the selecting switch and handle 136' to return to neutral is effected by the clutch pedal switch 115 which completes the circuit of the releasing magnet 182, as shown in Fig. 1, and the device is neutralized through the conductor 89 as in Fig. 1.

It will be understood that in using the clutch pedal actuated selecting switch shown in Fig. 15 or the accelerator pedal actuated selecting switch shown in Fig. 16, the solenoid 150 and its circuit connections shown in Fig. 1 will be omitted, but the circuits will otherwise be the same as shown in Fig. 1 and the mode of operation will be the same as described.

The clutch pedal and/or accelerator pedal which control the speed changing operations are herein regarded broadly as power controlling elements since they control the power applied to the automobile to drive it, and these pedals, although usually operated by the feet of the driver, are to be regarded as manually operable since they are operable at the will of the driver.

It will be noted that the controlling functions of the clutch pedal or accelerator pedal with respect to the speed selecting and changing operations are performed by such pedals when moved beyond their normal range of operation in performing their usual or primary functions in the operation of the automobile, so that free use of these pedals for performing their usual functions is always available without affecting the speed changing mechanism until such is desired. Moreover, by utilizing these pedals to control the speed changing operations, it is only necessary to move them beyond their usual range of operation, thereby facilitating the operation of the automobile and avoiding the expense of providing separate controls.

By providing means controlled by successive actuations of the clutch pedal or the accelerator, or by both of these pedals when operated conjointly, to automatically select the speed changes progressively from low or first speed through an intermediate or second speed to high or third speed, the operation of an automobile is greatly facilitated, especially in starting the automobile into motion from a standstill, and the device responsive to the movement or travel of the automobile and controlling the operation of the solenoid which advances the selecting switch prevents operation thereof unless the automobile is in motion, thereby avoiding advancing of the selecting switch by careless operation of the accelerator pedal while the automobile is stopped.

The means provided for manually selecting the speed changes independently of the automatic means enables the speed changes to be selected selectively or in any desired order, and since the movements of the manual means are similar to those of the conventional hand shifting lever heretofore used generally, it may be operated with facility by anyone accustomed to the use of such a hand shifting lever. The construction of the hand lever for manually selecting the speed changes and the formation of the notches of the slot in which it operates facilitates the operation of this lever and avoids unintentional setting thereof in reverse or neutral.

The means controlled automatically by the clutch pedal for releasing the selecting switch and restoring it to its initial or first speed position when the automobile is stopped enables the transmission to be restored from second or intermediate or third or high speed to low or first speed automatically, thus preparing the transmission for the next start, and the manual operation of the releasing means for the selecting switch enables it to be restored from any higher speed to first or low speed, thus enabling the selecting switch to be operated manually to select the speed changes selectively or in any desired order, either from a lower to a higher speed or from a higher to a lower speed, and while the automobile is in motion or not in motion, if desired.

By controlling the speed changing operations so that they are actually performed only while the clutch pedal is in clutch-disengaged position beyond its range of operation in performing its primary function, clashing of gears is avoided, and by controlling the speed changing operations so that they are performed only while the accelerator pedal is in closed-throttle position beyond the range of its operation in performing its throttle controlling function, racing of the automobile engine during the speed changes is avoided. By controlling the speed changing operations so that they are actually performed only while the clutch pedal is in clutch disengaged position and the accelerator pedal is in closed throttle position, clashing of the gears and racing of the engine during the speed changes are both avoided.

By constructing the selecting switch and its cooperative parts as a self contained unit, as shown, this switch may be readily accommodated on an automobile in a position within convenient reach of the driver, such as on the steering column as shown.

By constructing the governor controlling the actuating solenoid for the selecting switch and the releasing magnet for the retaining latch thereof as a unit and interposing it in the drive shaft for the usual speedometer, installation of the governor is facilitated and the necessity of employing a separate drive for the governor is avoided, and moreover, the governor may be accommodated in a small available space.

I claim as my invention:

1. Control means for the changeable speed transmission of an automobile having a manually operable fuel controlling element for controlling the operation of the automobile engine, comprising selecting means operable to select different speed changes of the transmission, means responsive to operation of said fuel controlling element for automatically operating the selecting means to select speed changes of the transmission from a lower speed to a higher speed, and means rendered operative by movement of said fuel controlling element beyond its normal range of operation in controlling the engine for restoring the selecting means from a higher to a lower speed position.

2. Control means for the changeable speed transmission of an automobile having an accelerator pedal for controlling the throttle of the automobile engine, comprising selecting means operable to select different speed changes of the transmission, means responsive to successive operations of the accelerator pedal for automatically operating the selecting means to select speed changes of the transmission from a lower speed to a higher speed, and means releasable by movement of said accelerator pedal beyond its normal range of movement in controlling the operation of the engine for restoring the selecting means from a higher to a lower speed position.

3. Control means for the changeable speed transmission of an automobile having a fuel control element for the engine thereof and a clutch means for controlling the clutch connecting the engine to the transmission, comprising selecting means operable to select the different speed changes of the transmission, means responsive to successive operations of said fuel control element for automatically operating the selecting means to select the speed changes of the transmission progressively from low speed through an intermediate speed to high speed, and means releasable by operation of said clutch means for restoring the selecting means from a higher to a lower speed position.

4. Control means for the changeable speed transmission of an automobile having an element for controlling the clutch connecting the transmission to the engine and a fuel control element for the engine, comprising selecting means operable to select the different speed changes of the transmission, means responsive to successive operations of said clutch and fuel control elements conjointly for automatically operating the selecting member to select the speed changes of the transmission progressively from low speed through an intermediate speed to high speed, and means releasable by said clutch controlling element for restoring the selecting means from a higher to a lower speed position.

5. Control means for the changeable speed transmission of an automobile having a manually operable power controlling element, comprising selecting means operable to select the different speed changes of the transmission, means responsive to successive operations of said power controlling element for automatically operating the selecting means to select the speed changes of the transmission progressively from low speed through an intermediate speed to high speed, means for operating the selecting means manually independently of said power controlling element to select the speed changes of the transmission selectively, and means releasable by operation of said power controlling element for restoring the selecting means from a higher to a lower speed position.

6. Control means for the changeable speed transmission of an automobile having an element for controlling the clutch connecting the transmission to the automobile engine, comprising selecting means operable to select the different speed changes of the transmission, means responsive to successive operations of the clutch controlling element for automatically operating the selecting means to select the speed changes of the transmission progressively from low speed through an intermediate speed to high speed, means for operating said selecting means manually independently of the clutch controlling element to select the speed changes of the transmission selectively in any desired order, and means releasable by operation of the clutch controlling element for restoring said selecting means from high to low speed and also releasable manually to restore said selecting means to low speed from any other speed.

7. Control means for the changeable speed transmission of an automobile having a manually operable power controlling element, comprising selecting means operable to select the different speed changes of the transmission, means responsive to successive operations of said power controlling element for automatically operating the selecting means to select the speed changes of the transmission progressively from low speed through an intermediate speed to high speed, a device responsive to traveling movement of the automobile for rendering said operating means inoperable when the automobile is stopped, and means releasable by operation of said power controlling element for restoring the selecting means to its low speed position.

8. Control means for the changeable speed transmission of an automobile having a manually operable power controlling element, comprising selecting means operable to select the different speed changes of the transmission, means responsive to successive operations of said power controlling element for automatically operating the selecting means to select the speed changes of the transmission progressively from low speed through an intermediate speed to high speed, a device responsive to travelling movement and speed of the automobile, and means controlled by said device and releasable by operation of said power controlling element when the automobile is stopped or its speed is below a predetermined minimum for restoring said selecting means to its low speed position.

9. Control means for the changeable speed transmission of an automobile having a manually operable power controlling element, comprising selecting means operable to select the different speed changes of the transmission, means responsive to successive operations of said power controlling element for automatically operating the selecting means to select the speed changes of the transmission progressively from low speed through an intermediate speed to high speed, a device responsive to travelling movement and speed of the automobile for rendering said operating means operable while the automobile is in motion at a speed above a predetermined minimum and inoperable when below such minimum or is stopped, and means releasable by operation of said power controlling element for restoring the selecting means to its low speed position.

10. Control means for the changeable speed transmission of an automobile having a manually operable power controlling element, comprising selecting means including a reciprocatory selecting member operable to select the different speed changes of the transmission, means responsive to successive operations of said power controlling element beyond its range of operation to perform its power controlling function for automatically reciprocating said selecting member in one direction to select the speed changes of the transmission progressively, means acting to reciprocate said member in the opposite direction to restore it to initial position, releasable means for retaining said member in its speed selecting positions, and means controlled by said power controlling element for releasing said retaining means.

11. Control means for the changeable speed transmission of an automobile having a manually operable means for controlling the clutch connecting the transmission to the automobile engine, comprising selecting means including a reciprocatory selecting member operable to select the different speed changes of the transmission, means responsive to successive operations of the clutch means beyond its range of operation in performing its clutch controlling function for automatically reciprocating said selecting member in one direction to select the speed changes of the transmission progressively, means acting to reciprocate said member in the opposite direction to restore it to initial position, releasable means for retaining said member in its speed selecting positions, and means controlled by said clutch means for releasing said retaining means.

12. Control means for the changeable speed transmission of an automobile having a fuel control element for the engine thereof and an element for controlling the clutch connecting the engine to the transmission, comprising selecting means including a reciprocatory selecting member operable to select the different speed changes of the transmission, means responsive to successive actuations of said fuel control element beyond its range of operation to perform its fuel controlling function for automatically reciprocating the selecting member in one direction to select the speed changes of the transmission progressively, means acting to reciprocate the selecting member in the opposite direction to retore it to initial position, releasable means for retaining the selector in its speed selecting positions, and means controlled by the clutch controlling element for releasing said retaining means.

13. Control means for the changeable speed transmission of an automobile having a manually operable power controlling element, comprising selecting means including a reciprocatory selecting member operable to select the different speed changes of the transmission, means responsive to successive operations of said power controlling element beyond its range of operation to perform its power controlling function for automatically reciprocating said selecting member in one direction to select the speed changes of the transmission progressively, means for reciprocating and rotating said selecting member manually independently of said power controlling element to select the speed changes of the transmission selectively, means acting to reciprocate the selecting member to restore it to initial position, and means for releasably retaining the selecting member in its different speed selecting positions.

14. Control means for the changeable speed transmission of an automobile having a manually operable power controlling element, comprising selecting means including a reciprocatory selecting member operable to select the different speed changes of the transmission, means responsive to successive operations of said power controlling element beyond its range of operation to perform its power controlling function for automatically reciprocating said selecting member in one direction to select the speed changes of the transmission progressively, means for reciprocating and rotating said selecting member manually independently of said power controlling element to select the speed changes of the transmission selectively, means acting to reciprocate the selecting member to restore it to initial position, and means releasable by said power controlling element and also releasable manually for retaining the selecting member in its different speed selecting positions.

15. Control means for the changeable speed transmission of an automobile having means for controlling the clutch connecting the transmission to the automobile engine and a fuel control element for the engine, comprising means controlled by the fuel control element for effecting the different speed changes, selecting means including a reciprocatory selecting member operable to select the different speed changes, and means responsive to successive actuations of the clutch means for automatically operating the selecting member to select the speed changes of the transmission progressively from low speed through an intermediate speed to high speed, and means controlled by said clutch means for restoring said selecting member to its low speed position.

16. Control means for the changeable speed transmission of an automobile having an element for controlling the clutch connecting the engine to the transmission, comprising means for effecting the different speed changes, means for selecting the speed changes, and a solenoid controlled by said clutch controlling element for actuating the selecting means successively to select the speed changes progressively.

17. Control means for the changeable speed transmission of an automobile having an element for controlling the clutch connecting the engine to the transmission, comprising means for effecting the different speed changes, means for selecting the speed changes, a solenoid controlled by said clutch controlling element for actuating the selecting means successively to select the speed changes progressively, and electromagnetically controlled means controlled by at least said clutch controlling element for restoring the selecting means to a position to select a lower speed.

18. Control means for the changeable speed transmission of an automobile having an element for controlling the clutch connecting the engine to the transmission, comprising means for effecting the different speed changes, means for selecting the speed changes, a solenoid controlled by said clutch controlling element for actuating the selecting means successively to select the speed changes progressively, a device controlled by travelling movement of the automobile, and means controlled by said clutch controlling element and said device for restoring the selecting means to its initial position.

19. Control means for the changeable speed transmission of an automobile having an element for controlling the clutch connecting the engine to the transmission, comprising means for effecting the different speed changes, means for selecting the speed changes, a solenoid for operating the selecting means to select the speed changes progressively, a switch controlled by travelling movement and speed of the automobile, and electromagnetically controlled means rendered operative by said switch when the automobile is stopped or its speed is below a predetermined minimum and by operation of said clutch controlling element for restoring the selecting means to its initial position.

20. In or for control means for a changeable speed transmission, selecting means comprising a member movable to select speed changes, said member having means for moving it manually to select speed changes selectively, means independent of said manual means for advancing said member step-by-step to select speed changes progressively from low speed through an intermediate speed to high speed, and releasable means for restoring said member to its low speed position.

21. In or for control means for a changeable speed transmission, selecting means comprising a member movable to select speed changes, said member having means for moving it manually to select speed changes selectively, electromagnetically controlled means independent of said manual means for advancing said member step-by-step to select speed changes progressively from low speed through an intermediate speed to high speed, and releasable means for restoring said member to its low speed position.

22. In or for control means for a changeable speed transmission, selecting means comprising a member movable to select speed changes, a solenoid having a reciprocatory core and means operative by successive actuations thereof to advance said member step-by-step to select speed changes progressively, means acting to restore said member to its initial position, and releasable means for retaining said member at each step in its advance.

23. In or for control means for a changeable speed transmission, selecting means comprising a member rotatable and movable axially to select speed changes, means for manually rotating said member and moving it axially to select speed changes selectively, means for moving said member axially to select speed changes progressively independently of said manual means, and releasable means for retaining said member in the different axial positions into which it is moved.

24. In or for control means for a changeable speed transmission, selecting means comprising a member rotatable and movable axially to select speed changes, means for manually rotating said member and moving it axially to select speed changes selectively, electromagnetically controlled means for moving said member axially, means for yieldably retaining said member in the positions into which it is rotated, and releasable means for retaining said member in the axial positions into which it is moved.

25. In or for control means for a changeable speed transmission, selecting means comprising a member movable in opposite directions for selecting speed changes, electromagnetically controlled means operative by successive actuations thereof to advance said member step-by-step in one direction to select speed changes, means tending to move said member in the opposite direction to restore it to its initial position, a toothed element connected to and movable with said member, and a latch cooperative with said toothed element to automatically retain said member at each step in its advance, said latch being operable to release said member for restoration to its initial position.

26. In or for control means for a changeable speed transmission, selecting means comprising as a unit a casing, a selecting switch contained therein and embodying relatively fixed contacts and a movable contact cooperative therewith, electromagnetically controlled means enclosed within the casing and operative, by successive actuations thereof, to advance the movable contact step-by-step, means within the casing and acting to restore said movable contact to initial position, and means in the casing for retaining said movable contact at the different steps in its advance.

27. In control means for the changeable speed transmission of an automobile having a steering column, selecting means comprising as a unit a casing mounted on the steering column, a selecting switch contained therein and embodying speed change selecting contacts and a movable contact cooperative therewith, electromagnetically controlled means enclosed within the casing and operative, by successive actuations thereof, to advance the movable contact step-by-step, means acting to restore said movable contact to initial position, manual means extending to the exterior of the casing and connected to the movable contact for operating the latter, and means within the casing for releasably retaining the movable contact at the different steps in its advance.

28. In control means for the changeable speed transmission of an automobile having a steering column, selecting means comprising as a unit, a casing mounted on the steering column, a selecting switch contained therein and embodying speed change selecting contacts and a movable contact cooperative therewith, electromagnetically controlled means enclosed within the casing and operative, by successive actuations thereof, to advance the movable contact step-by-step, means acting to restore said movable contact to initial position, manual means extending to the exterior of the casing and connected to the movable contact for operating the latter, and means within the casing and extending to the exterior thereof for manual operation for releasably retaining the movable contact at the different steps in its advance.

29. In or for control means for the changeable speed transmission of an automobile having a fuel control element for the engine thereof, and means for selecting the different speed changes, the combination of a speed responsive device having means for driving it in accordance with the speed of the automobile and having means for rendering said selecting means operative to control speed changes from a lower to a higher speed, and means responsive to movement of said fuel control element beyond its normal range of operation in controlling the engine for controlling speed changes from a higher to a lower speed.

30. In or for control means for the changeable speed transmission of an automobile having a speedometer and a shaft for driving it in accordance with the movement of the automobile and selecting means having means for operating it to select the different speed changes progressively from low speed through an intermediate speed to high speed, a speed responsive device interposed in said speedometer drive shaft to be driven thereby in response to speed of the automobile, and means governed by said speed responsive device for restoring the selecting means to its low speed selecting position.

31. In or for control means for the changeable speed transmission of an automobile having a speedometer and a shaft for driving it in accordance with the speed of the automobile and selecting means having means for operating it to select the different speed changes progressively from low speed through an intermediate speed to high speed, a speed responsive device interposed in said speedometer drive shaft to be driven thereby in response to speed of the automobile, means governed by said speed responsive device for rendering the selecting means operable to select the different speeds progressively, and means governed by said speed responsive device for restoring the selecting means from a higher to a lower speed selecting position.

32. A gear changing device for the changeable speed transmission mechanism of an automobile having a plurality of gear changing elements each movable in opposite directions to effect different gear changes, and a fuel control element for the automobile engine, comprising a rotatable shaft having an actuating member fixed thereon to rotate coaxially therewith and having means for operatively connecting it to one or another of said gear changing elements, operating means for rotating said actuating member in one or the other direction to actuate the element to which it is connected to effect one or another gear change, selecting means including a controlling member located remotely from the transmission mechanism for controlling the direction of movement of said actuating member and the connection of said actuating member to one or another gear changing element, means including a rotatable member connected to said shaft for rotation thereby and operative under control of said selecting means and by rotation of said shaft to control the direction of movement of said actuating member and to interrupt the movement of said actuating member when said actuating member reaches a predetermined position, and means controlled by the fuel control element for rendering operative said selecting means and said means for controlling the direction of movement and for interrupting the movement of said actuating member.

33. A gear changing device for an automobile changeable speed transmission mechanism having a plurality of gear changing elements each movable in opposite directions to effect different gear changes, a fuel control element for the automobile engine and a clutch for connecting said mechanism to the automobile engine, comprising a rotatable shaft having an actuating member fixed thereon to rotate coaxially therewith, means for operatively connecting said actuating member to one or another of said gear changing elements, operating means for rotating said actuating member to effect one or another gear change, selecting means including a controlling member located remotely from the transmission mechanism for controlling the direction of movement of said actuating member and the connection of said actuating member to one or another gear changing element, means including a rotatable member connected to said shaft for rotation thereby and operative under control of said selecting means and by rotation of said shaft to control the direction of movement of said actuating member and to interrupt the movement of said actuating member when said actuating member reaches a predetermined position, and means controlled by said fuel control element and by the disengagement of said clutch for rendering operative said selecting means and said means for controlling the direction of movement and for interrupting the movement of said actuating member.

34. A plurality of control means for the changeable speed transmission of an automobile having a fuel control element for the engine thereof, comprising selecting means operable to select speed changes progressively or retrogressively, and means including an electro-magnetic switch responsive to operation of said fuel control element beyond its engine controlling function for interrupting power flow through the transmission and subsequently re-establishing power flow therethrough, for controlling the speed changes retrogressively.

35. A plurality of control means for the changeable speed transmission of an automobile having a fuel control element for the engine thereof, comprising selecting means operable to select speed changes from a lower to a higher speed and from a higher to a lower speed, and means including an electro-magnetic switch responsive to operation of said fuel control element beyond its engine controlling function for controlling the speed changes from a higher to a lower speed.

36. A plurality of control means for the changeable speed transmission of an automobile having a fuel control element for the engine thereof, comprising selecting means operative automatically under control of the fuel control element to select speed changes from a lower to a higher speed, means including an electro-magnetic switch responsive to operation of said fuel control element beyond its engine controlling function for controlling a speed change from a higher to a lower speed, and manual selecting means entirely independent of said automatic selecting means.

EDWARD J. THURBER.